United States Patent [19]

Mokdad et al.

[11] Patent Number: 5,784,928
[45] Date of Patent: Jul. 28, 1998

[54] DAMPED FLYWHEEL, ESPECIALLY FOR A MOTOR VEHICLE

[75] Inventors: Ayman Mokdad, Saint-Ouen; Jean-Claude Bochot, Claye-Souilly, both of France

[73] Assignee: Valeo, Paris, France

[21] Appl. No.: 605,014

[22] PCT Filed: Jun. 30, 1995

[86] PCT No.: PCT/FR95/00876

§ 371 Date: Feb. 28, 1996

§ 102(e) Date: Feb. 28, 1996

[87] PCT Pub. No.: WO96/00859

PCT Pub. Date: Jan. 11, 1996

[30] Foreign Application Priority Data

Jun. 30, 1994 [FR] France ............... 95 08035

[51] Int. Cl.[6] ............... F16F 15/139; F16F 15/167; F16F 15/131
[52] U.S. Cl. ............... 74/574; 464/68; 192/55.61; 192/70.17
[58] Field of Search ............... 74/574; 192/30 V, 192/55.61, 70.17, 213.12, 213.22, 213.31, 214.1, 113.5; 464/7, 24, 64, 67, 68

[56] References Cited

U.S. PATENT DOCUMENTS

| 4,782,936 | 11/1988 | Bopp ............... 74/574 X |
| 4,790,419 | 12/1988 | Loizeau ............... 74/574 X |
| 5,083,981 | 1/1992 | Forster ............... 464/68 |

FOREIGN PATENT DOCUMENTS

| 2565650 | 12/1985 | France . |
| 2676102 | 11/1992 | France . |
| 2931423 | 2/1980 | Germany . |
| 3427163 | 4/1986 | Germany . |
| 3902110 | 7/1990 | Germany ............... 192/70.17 |
| 4135631 | 4/1992 | Germany . |
| 2160296 | 12/1985 | United Kingdom . |

*Primary Examiner*—Richard M. Lorence
*Attorney, Agent, or Firm*—Longacre & White

[57] ABSTRACT

A damped flywheel comprising two coaxial masses (1, 6) mounted for movement of one with respect to the other against the action of springs (150) and of a friction member (170), in which the inertia of the first mass (1) is increased by locating the resilient member (150) entirely inwardly, in the radial sense, of the friction face (125) of the clutch itself.

10 Claims, 3 Drawing Sheets

DAMPED FLYWHEEL, ESPECIALLY FOR A MOTOR VEHICLE

The present application claims the benefit of previously filed French patent application 95.08035 filed in France on Jun. 30, 1994 and PCT international application FR95/00876 filed on Jun. 30, 1995 to which the instant application corresponds.

BACKGROUND OF THE INVENTION

1. Field of the Invention

The present invention relates to damped flywheels, especially for motor vehicles, of the kind comprising two coaxial masses, which are mounted for movement of one with respect to the other against the action of circumferentially acting resilient means and of an axially acting friction means. It also relates to a clutch, especially for a motor vehicle, equipped with such a flywheel.

2. Description of the Prior Art

Such a damped flywheel, which is also referred to as a double damped flywheel, is described for example in the document FR-A-2 565 650. Such a damped flywheel is adapted to absorb the vibrations which arise along the kinematic train constituted by the transmission, and which, in a motor vehicle, extends from the internal combustion engine to the road wheels.

In the said document, the friction means works between the first mass (a plate of the latter) which is adapted to be fixed to a drive shaft (the crankshaft of the engine of the vehicle) and a disc fixed on the second mass and comprising a reaction plate for a friction clutch, this being at the inner periphery of the damped flywheel.

As a result, it is necessary to machine the plate of the first mass at this point, and the friction means increases the axial size of the flywheel at this point.

However, such a device is well adapted to receive resilient means acting circumferentially between the two masses. Now, it is desirable that the first mass should have a high inertia, in order to obtain good damping of mechanical vibrations.

By contrast with this requirement, the machining of the first mass, the profiles which are necessary in order to accommodate the friction means, and the positioning of the circumferential resilient means, all lead to a reduction in this inertia.

An object of the present invention is to create a new structure for a damped flywheel or double flywheel, in which the inertias are made as high as possible.

SUMMARY OF THE INVENTION

In this connection, the present invention relates to a damped flywheel, especially for a motor vehicle, of the kind comprising two coaxial masses, mounted for movement of one with respect to the other against circumferentially acting resilient means and against an axially acting friction means. One of the masses, referred to as the first mass, is adapted to be mounted in rotation on a driving shaft (the crankshaft of the engine), while the other mass, referred to as the second mass, comprises a reaction plate offering a friction face for a friction disc which is adapted to be mounted in rotation on a driven shaft (the input shaft of the gearbox).

The invention is characterised mainly by the fact that the resilient means are disposed entirely radially inwardly of the inner periphery of the friction face of the second mass.

The invention makes it possible to increase the inertia of the first mass, the latter being able to be massive at the level of the friction face of the second mass.

This arrangement enables the axial size of the damped flywheel to be reduced, because the springs are not in facing relationship with the friction face.

In addition, there are no recesses to be formed at this point, so that the reaction plate is more robust.

It will be appreciated that the recess or recesses formed in the first mass, for accommodating the said resilient means, are located on a circle the diameter of which is smaller than that in the prior art, so that the inertia of the first mass is increased.

According to another aspect of the invention, the friction means is disposed radially outwardly of the resilient means.

In a modified version, the friction means is disposed radially inwardly of the resilient means, which enables the inertia of the first mass to be increased even more.

According to another aspect of the invention, the second mass is configured in such a way as to overlap the resilient means installed on the first mass, in order to reduce the axial size.

According to a further aspect of the invention, the means of configuration consists of an arched portion.

According to another aspect of the invention, the second mass comprises means for fastening to a damper plate which is adapted to act on the said resilient means, with the said damper plate having a tubular axial flange which penetrates into an internal hole in the said first mass, and which is coupled to it in rotation by means of an anti-friction bearing.

This arrangement enables the axial size of the damped flywheel to be reduced at this point, and the anti-friction bearing is of small diameter.

In practice, this bearing is fitted radially inwardly of passages formed in the masses for accommodating the screwed fasteners by which the flywheel is fastened to the crankshaft of the engine.

According to a further aspect of the invention, the damper plate has U-shaped recesses bounded by radial arms, between which the resilient means are fitted, a closure element being fixed on the first mass and being interposed between the resilient means and the said second mass, in such a way as to define a cavity which is sealed by an annular double seal which is disposed between the first mass and the damper plate on the one hand, and between the damper plate and the said second mass on the other hand.

According to a further aspect of the invention, the double seal comprises a first part, the outer diameter of which is engaged on a dihedral projection of the said first mass, with its inner diameter being engaged in contact with an inclined portion of the said damper plate, and in that it comprises a second part, the inner diameter of which is engaged on the said inclined portion of the said damper plate, with its outer diameter being engaged in contact with the inner face of the end portion of the closure element beyond an arched portion of the latter, the said arched portion being adapted to fit within the arched portion of the said second mass.

According to another aspect of the invention, the friction device has a friction surface disposed within a cavity in the said first mass, on the surface of the latter that faces towards the said second mass, on which friction surface there is disposed a friction ring, the movements of which are governed by the said second mass and on which there bears a thrust ring which is urged elastically towards it by axially acting resilient means.

According to a further aspect of the invention, the friction surface comprises a flat end zone of the closure element which further includes a flange for maintaining in action, through an annular ring, the axially acting resilient means.

3

The closure element thus has a triple function, namely a function of providing an abutment for the resilient means, a function of sealed closure for the cavity within which the resilient means are fitted, and a frictional function.

According to another aspect of the invention, the frictional engagement is obtained by the engagement of at least one projecting element joined fixedly to the facing surface of the said second mass.

According to a further aspect of the invention, the engagement is obtained by means of a flange corresponding to the inner diameter of the friction ring, in particular in order to obtain meshing with a clearance.

According to a further aspect of the invention, the clutch includes a friction disc with a hub having an inclined portion, together with a disc carrying friction liners and having an arched portion at the level of the resilient means, the said arched portion having a profile complementary to that of the second mass.

By virtue of all these arrangements, the axial dimension between the pressure plate of the clutch and the first mass of the damped flywheel is not increased.

It thus becomes possible to increase the inertia of the first mass while fitting the friction device radially outwardly or inwardly of the circumferentially acting resilient means. In this second form, the components of the flywheel are simplified.

The invention also relates to a clutch, especially for a motor vehicle, equipped with a double damped flywheel in accordance with the foregoing.

Further features and advantages of the present invention will be understood better in the light of the description and of the attached drawings, in which:

DETAILED DESCRIPTION OF THE PREFERRED EMBODIMENT

Figure 1:
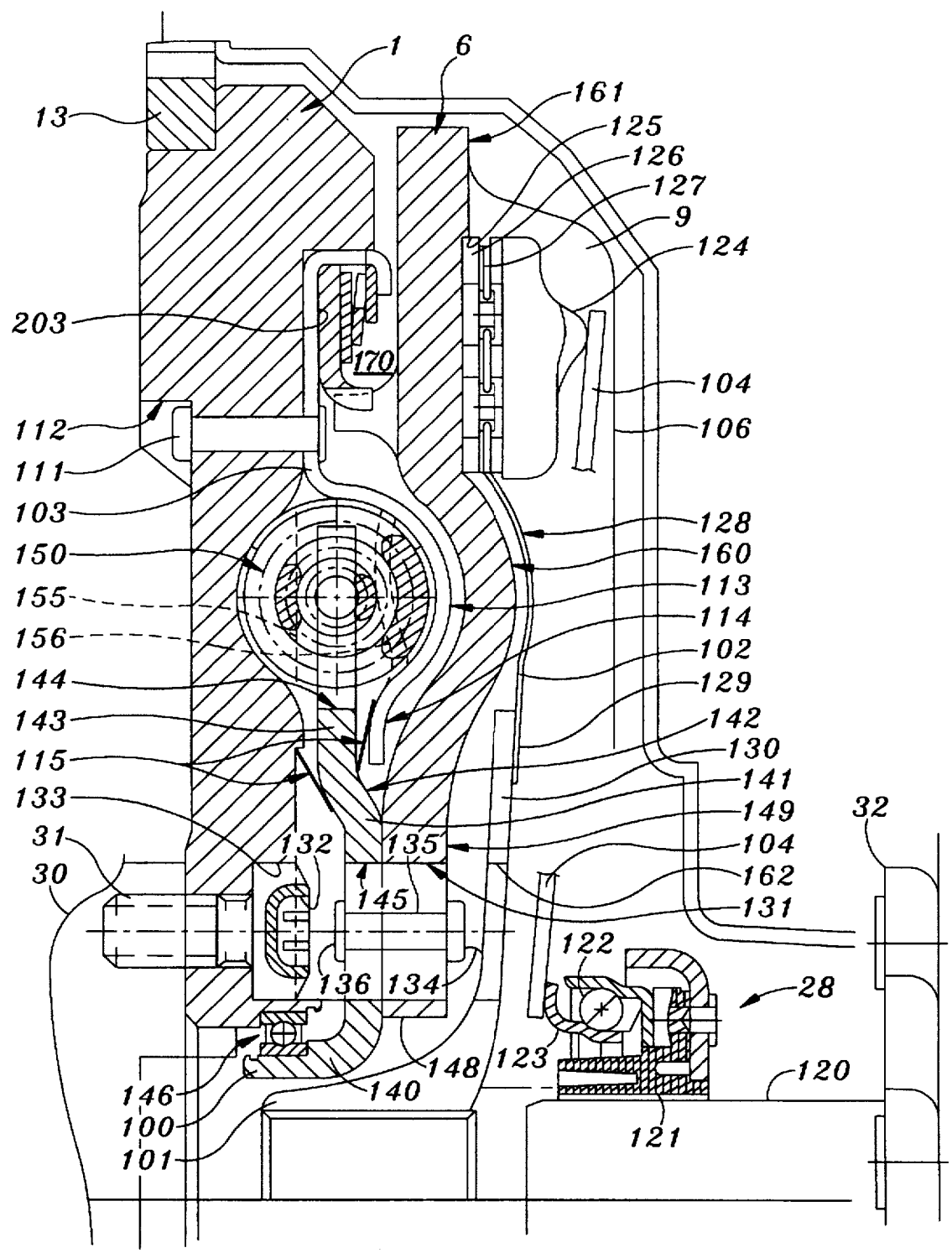
FIG. 1: a half view in transverse cross section of a double damped flywheel for a clutch, in a preferred embodiment of the invention.

FIG. 1 shows a half view in axial cross section of a clutch according to the present invention, in a preferred embodiment of the latter. The clutch of the invention includes a damped flywheel, usually referred to as a double damped flywheel, which is defined by a first mass 1 and a second mass 6, together with a conventional clutch which includes, in particular, a diaphragm 104 acting on a pressure plate 9, which bears on a friction disc 127 that acts through its other face on the reaction plate 161, and more precisely on the friction face 125 which faces towards the second mass 6 of the double damped flywheel.

This double flywheel comprises, in a manner known per se, two coaxial masses 1, 2, which are mounted for movement of one with respect to the other against the action of circumferentially acting resilient means 150 and of an axially acting friction means 170.

4

More precisely a driving shaft 30, which in this example, in its application to a motor vehicle, comprises the output end of the crankshaft of the internal combustion engine of the vehicle, is fixed by means of studs 31 on the central zone of a thick disc that constitutes the first mass 1 of the flywheel, with its double mass, of the clutch of the invention. The disc 1 has on its outer periphery a toothed crown 13 which is arranged to mesh with the output pinion of a starter in the known way.

The disc 1 is pierced in its central zone with a bore which is aligned on the axis of rotation of the crankshaft and clutch, and an axially orientated annular flange 100 of a damper plate 140 passes through this bore. The damper plate 140 has a portion 141 which is substantially in the form of a flat ring perpendicular to the above mentioned axis of rotation, and which has through holes 145 spaced apart at regular intervals along a pitch circle, for accommodating the fastening studs 31.

The portion 141 is attached firstly to the above mentioned tubular axial flange 100, and secondly, through an inclined portion 142, to a second portion 143 which is again substantially in the form of a flat ring, extending at right angles to the axis of rotation and having recesses 144 for locating therein the circumferentially acting resilient means 150.

The recesses 144 in the damper plate 140 are spaced apart circumferentially about the axis of rotation, and in one embodiment there are three of them. The recesses 144 are substantially U-shaped, being bounded by outer radial arms 151 and having an angular extent sufficiently large to permit the placing and mounting of the resilient means 150 between the arms 151 which circumferentially delimit the recesses 144 and which constitute the branches of the said recesses.

Finally, the damper plate 140 is mounted, through the outer surface of its axial flange 100, on an anti-friction bearing 146.

The bearing 146 consists in this example of a ball bearing, the outer ring of which is mounted in a groove formed in the internal central bore of the first mass 1, with its outer ring being mounted on the tubular flange 100.

In addition, the damper plate 140 is fixed to a thick disc 6 which constitutes most of the second mass of the damped flywheel. The damper plate 140 therefore constitutes a solid body with the second mass 6, which is fixed to the driven shaft, not shown, for rotation with the latter through the interposed friction disc 127 when the clutch is engaged in a manner known per se.

The fastening of the disc-shaped second mass 6 and damper plate 140 together is obtained by fastening means. In a preferred embodiment, these fastening means consist of rivets 134, 135, 136, which are disposed close to the axial flange 100 of the damper plate 140, and which are inserted in holes spaced apart circumferentially between the holes 145 and 131, and formed respectively in the damper plate 140 and in the second mass 6 for accommodating the studs 31.

These holes are therefore disposed alternately with the holes 145 to 131 which are located radially outwardly of the ball bearing 146, which is accordingly of a reduced size. In a modification, this bearing 146 may be replaced by a plain bearing.

The second mass 6 also has an internal bore 148 which is centred on the above mentioned axis of rotation, together with an internal first portion 149 in the form of a flat ring at right angles to the said axis of rotation. The flat ring 149 is continued outwardly by a curved portion 160, which is terminated by a second portion in the form of a flat ring 161, which is substantially parallel to the ring-shaped first portion 149, and which terminates in the outward direction and constitutes the reaction plate proper of the clutch.

It is this portion 161 that offers the friction face 125 for the disc 127.

It will be noted that, thanks to the flange 100, the axial size of the flywheel is reduced in this region, with the second mass having an internal bore 148 the diameter of which is greater than that of the tubular flange 100.

The curved portion, or arched portion, 160 of the second mass 6 is a preferred form for the configuration of the second mass, being such that it overlaps the circumferentially acting resilient means 150 which are fitted in the damper plate 140. In particular, this arched portion enables any increase in the axial size of the double damped flywheel, with its constant masses, to be avoided.

The bore which is defined within the axial flange 100 of the damper plate 140 receives a hub 101 which is extended by a portion 130 in the form of an inclined ring. This inclined portion 130 is formed with through holes 162, which are spaced apart circumferentially close to the central bore and in such a way as to afford access, with a tool such as an Allen key, to each hollow head 132 of the studs 31 which secure the first mass 1 on the crankshaft. This means is repeated on each stud 31, and each alignment of holes such as 145, 131 and 162, spaced apart at regular intervals (twelve times, in one embodiment) about the axis of rotation.

In this way it is possible to dismantle and rebuild the assembly of the clutch on the crankshaft without having to dismantle the double damped flywheel of the invention.

The diaphragm 104 can of course have holes in alignment with the holes 145, 131, 162.

The head of each stud 30 is engaged in a corresponding socket 133 of the disc 1, so as to be flush with the surface of the disc without requiring this surface to be spaced too far away from the facing surface of the annular first portion 141 of the damper plate 140, and without reducing too much the mass of the first inertia mass.

The hub 101 is splined internally so as to couple the friction disc 127 in rotation with the input shaft (not shown), or driven shaft, of a gearbox 32.

On the end portion of the inclined ring-shaped portion 130 of the hub 131, this end portion being spaced radially away from the axis of rotation of the hub 101, an arched disc 128 is secured at its inner edge 129 by welding, riveting or otherwise, in overlapping relationship with the said end portion. The arched portion of the disc 128 is adapted to match the corresponding arched portion 160 of the second mass 6 of the double flywheel.

The disc 128 carries, on each of its faces, a friction liner 126 which is fixed, in this example by riveting, in the region of its radial (or peripheral) outer end,.

Thus, the friction disc 127, with its inclined portion 130 and its arched disc, enables any increase in the axial size of the double flywheel to be avoided, with the pressure plate 9 occupying the same position as in the prior art. It will be noted that the hub 101 is so profiled that it comes very close to the damper plate 140 and disc 6.

Its thickness increases at its base, going in the axial direction from the disc 1 to the disc 6.

In a manner known per se, the liners 126 are adapted to be gripped between the pressure plate 9 and the reaction plate 161 under the action of the diaphragm 104 bearing on a cover plate (indicated diagrammatically in outline at 106), which is fixed at its outer periphery on the plate 161.

More precisely, the friction liners 126 are adapted to be gripped between the facing surface of the pressure plate 9 and the friction plate 125 of the reaction plate 161. The clutch is thus normally engaged.

Here, it will be noted that the drawing shows the location of the resilient means 150 in accordance with the invention below the zone in which frictional activity takes place between the pressure plate 9, the pressure plate 161 (i.e. the friction face 125) and the liners 126 of the friction disc 127. This arrangement enables the inertia of the first mass 1 of the damped flywheel to be increased, and in particular it enables the thickness of the mass 1 to be increased at its outer periphery.

According to the invention, the resilient means 150 are thus disposed entirely radially inwardly of the inner periphery of the friction face 125 of the second mass 6.

In the known manner, the pressure plate 9 has a projecting portion 124 of divided form, for engagement by the outer peripheral portion of the Belleville ring of the diaphragm 104, the inner ends of the fingers of which are arranged to be acted on by a clutch release bearing 28. This clutch release bearing includes a manoeuvring element 121 which is arranged to be acted on by a declutching fork, and an actuating element 123 which, in this example, is in the form of a ball bearing and which is adapted to act on the inner ends of the fingers of the diaphragm 104.

The manoeuvring element 121 is mounted for sliding movement along a guide tube 120 known as a declutching horn, which surrounds the input shaft of the gearbox 32.

This horn is fixed to the casing of the gearbox 32.

Thus, by working in a thrust mode on the ends of the fingers of the diaphragm, the latter is deflected so that it ceases to bear on the pressure plate 9, thus releasing the friction liners 126 of the friction disc 127 and thereby disengaging the clutch, which is normally engaged.

For the pivoting mounting of the diaphragm, reference is made for example to the document FR-A-2 565 650, in which the said diaphragm is mounted for pivoting movement on the cover plate 106 by means, for example, of bar members not shown.

In a modification, the clutch release bearing may work in traction on the ends of the fingers of the diaphragm, the clutch then being of the pull-to-release type.

In that case, the outer periphery of the Belleville ring of the diaphragm bears on the cover plate, while the inner peripheral portion of the said Belleville ring then engages on the projecting portion 124 of the pressure plate 9.

Figure 2:
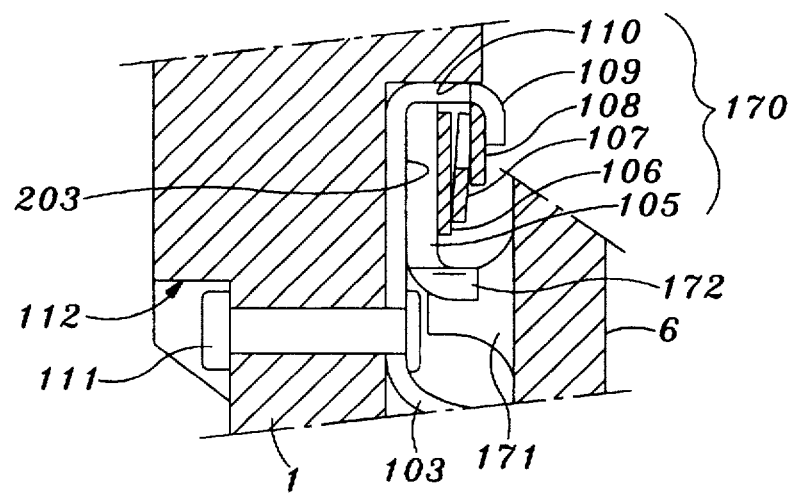
FIG. 2: an enlarged detail of the friction device of the double damped flywheel of FIG. 1.

The axially acting friction device 170, which is shown on a larger scale and in greater detail in FIG. 2, is installed between the facing surfaces of the first mass 1 and second mass 6 of the double damped flywheel. In this example this friction device is located at the radial level of the friction surface 125 of the pressure plate 161, that is to say radially inwardly of the circumferentially acting resilient means 150 at the outer periphery of the disc 1, in accordance with one feature of the invention.

The friction device 170 works between the two masses, and consists mainly of a friction ring 105 which is in frictional contact with a friction surface 203 fixed to one of the two masses. It also includes a thrust ring 106, which is acted on by axially acting resilient means 107 so that the friction ring 105 is gripped between the thrust ring 106 and the friction surface 203.

In this example the friction surface 203 is fixed to the first mass 1, in a manner described later herein, while the thrust ring 106 is arranged to be carried in rotation on the first mass 1.

Figure 3:
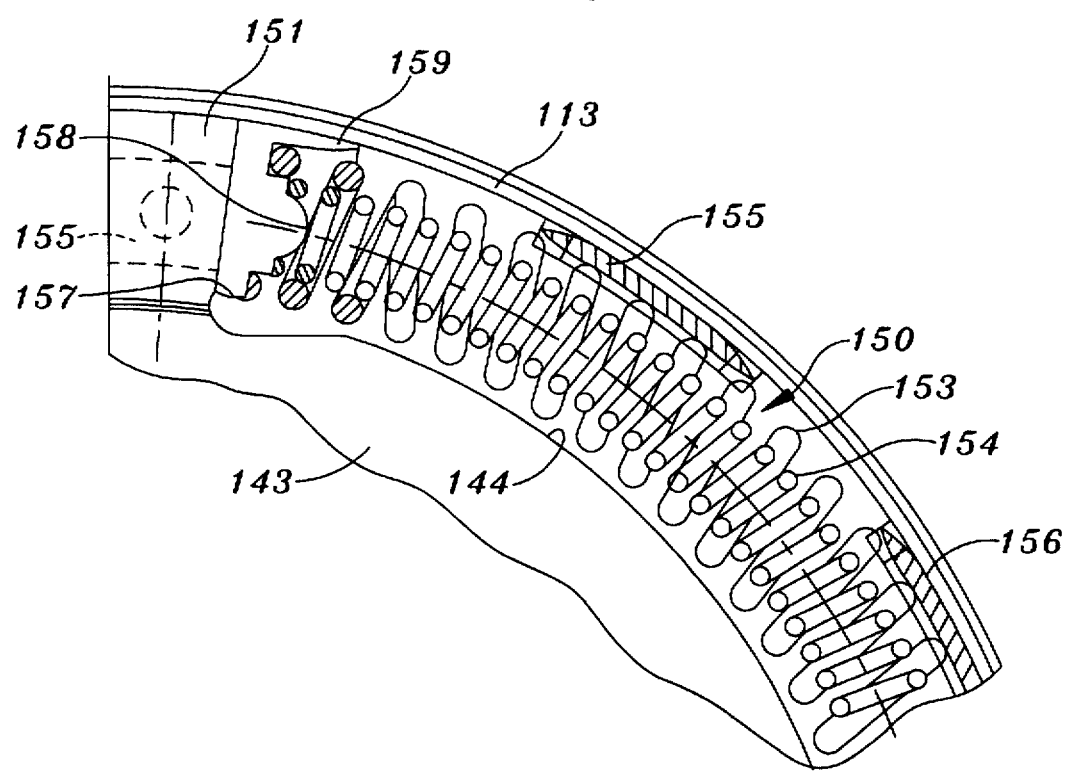
FIG. 3: an enlarged detail, in elevation, of the circumferentially acting resilient means of the double damped flywheel of FIG. 1.

More precisely, in the embodiment of FIGS. 1 to 3, the axially acting resilient means 107 consist of a Belleville ring which is frusto-conical in the free state.

In a modification, these resilient means may comprise two Belleville rings, or may consist of a corrugated ring.

According to one feature of the invention, the friction surface 203 consists directly of the facing surface of the closure element or member 103 which in this example is fixed to the first mass 1.

It is thus the outer periphery of the closure member 103 that has the friction surface 203.

It will be noted that the closure member 103 is mounted on the first mass in a rebate, which is bounded by an axially orientated internal centring surface 110 formed on the first mass 1 at its outer periphery.

The closure member 103 is thus mounted in a housing of the first mass, being fixed on the latter by means of rivets 111.

It will be noted that this member 103 accordingly has at its outer periphery an axially orientated, slotted, comb-shaped flange, the free ends 109 of which are bent radially inwardly.

The axial flange is centred by the above mentioned surface 110, and it extends towards the second mass 6.

It will be noted that the thrust ring 106 has at its outer periphery lugs, not shown, which mesh with the slots formed in the axial flange of the closure member 103. In this way the thrust ring 106 is mounted on the member 103 for rotation with it, while being movable axially with respect to the latter.

The Belleville ring 107 bears, firstly, on the ring 106 and secondly on an abutment ring 108 which is interposed between the teeth 109 and the ring 107.

The friction ring 105 has at its inner periphery an axially oriented flange 172. This flange 172 is formed with openings which constitute mortices into which complementary tenons 171 penetrate, in this example with a clearance. These tenons 171, which project axially, are fixed to the second mass 6, with which they are made integrally by moulding. The tenons 171 extend radially beyond the resilient means 150.

The ring 105 may mesh with the tenons 171 with or without any clearance.

Thus, during the relative movement between the two masses 6 and 1, the ring 105 engages frictionally against the surface 203 and against the thrust ring 106.

It will be noted that the rivets 111 are fitted by their heads in cavities 112 of the first mass 1, the said cavities being bounded by the outer surface of the mass 1 which faces away from the second mass 6.

Referring now to FIGS. 1 and 3, the axially acting resilient means 150, which act against the two movable masses 1 and 6 of the double damped flywheel of the invention, will now be described.

It will be noted that the circumferentially acting resilient means are located radially inward of the friction means of the double flywheel.

Their location inside the friction device (in the radial direction) enables the mass of the first flywheel 1 to be shifted outwardly towards its periphery, so that it then has an increased gyration radius, which maximises the moment of inertia without significantly increasing the weight of the rotating assembly.

FIG. 3 shows a cut-away partial view of the circumferentially acting resilient means 150. They consist of concentric coil springs 153 and 154, which are disposed in U-shaped housings 144 in the annular second portion 143 of the damper plate 140.

The ends of the concentric springs 153 and 154 are fitted on insert cups such as 157, 158, which are disposed on the radial arms, such as 151, of the damper plate 140.

Each insert cup has a central nose 158, which maintains the corresponding end of the inner coil spring 153 in position. It also includes an annular rebate 157 which receives the corresponding end of the outer coil spring 154.

Each insert cup 157, 158 has a flange 159 for guiding the springs, which are also guided by friction pads 155 and 156 which are fitted on the facing surface of the curved portion 113 of the closure member 103, and which rub frictionally against it during the relative movement of the outer spring 153 and member 113.

Accordingly, the resilient means 150 are lodged in cavities which are constituted by the "U" shape 144 of the damper plate 140, the arms 151 and the arched portion 113 of the closure member 103 fixed to the first mass 1 of the double flywheel.

It will be noted that the first mass 1 is recessed so as to accommodate the springs 150, and that an annular channel is defined with the arched portion of the closure element or member 103.

The recess of the mass 1 reduces the weight of the latter, but this is not detrimental to its inertia, having regard to the location of the resilient means 150 radially inward of the friction face 125.

The cavity constituted in this way is sealed by the riveting 111 of the closure member 103, and by an annular double seal 115 (or double sealing ring) which bears on both sides of the damper plate 140 at the level of its inclined portion 142. The first part (i.e. one of the sealing rings) of the annular double seal 115 is located by its outer diameter on a dihedral projection (which has no reference numeral in the drawing), which extends towards the axis of rotation and formed on the inner face of the first mass 1 of the double damped flywheel. The inner diameter of the first part of the annular seal 115 makes contact engagement on the facing surface of the curved portion 142 of the damper plate 140. These parts, or sealing rings, are fitted under precompression, and are inclined.

On the other side of the damper plate 140, the second part (i.e. the second sealing ring) of the annular double seal 115 is located through its inner diameter on the inclined portion 142 of the inner face of the damper plate 140 facing the second mass 6. The outer diameter of the second part of the double seal makes contact engagement on the inner face of the free end portion 114 of the element 103, radially inward of the arched portion 113 of the closure member 103.

The sealed cavity which is thus formed is filled with grease for lubricating the sliding movement of the springs when they are being compressed.

The circumferentially acting resilient means 150 act, mainly by virtue of the arms 151, in such a way as to constitute a torsion damping device which is interposed mechanically between the two masses of the double flywheel. Thus, in a manner known per se, during the relative angular displacement between the two masses 1 and 6, the springs 153 and 154 are compressed.

The closure member is of course embossed locally at 156 facing the arms 151, for engagement of the circumferential ends of the springs 153, 154, while the mass 1 carries abutment elements 155 facing the arms 151 and the embossed portions, for engagement with the ends of the springs 153, 154. More precisely, these abutments are provided indirectly by the insert cups 157, 158. The abutment elements 155 are secured on the first mass by riveting.

The description has been given only by way of example, and the person in the art will be able to adapt the invention to other embodiments within the ambit of the attached claims.

In particular, the rings 106, 107, 108 may be carried by the bosses or tenons 171, with the thrust ring meshing with the bosses 171 by means of lugs. In that case, the ring 105 may be driven in rotation by the foot of the rivets 111, with the ring 108 being in engagement on the first mass.

It will be appreciated, with reference to the document FR-A-2 565 650, that the first mass is simplified, having no central hub.

The present invention is of course not limited to the embodiment described. Thus, while in FIG. 1 the first mass may be a casting, the latter (FIGS. 4 and 5) may be of steel and may consist of three parts 401, 402, 403 joined together by welding, or, in a modified version, by riveting.

Thus, the part 401 carries the starter crown 13 and lies at the outer periphery of the first mass 1. The part 402 consists of a support plate having holes (not given reference numerals) through which screws pass for fastening to the crankshaft.

The third part 403 is tubular, and it is this which is fitted over the outer ring of the ball bearing 146.

Figure 4:
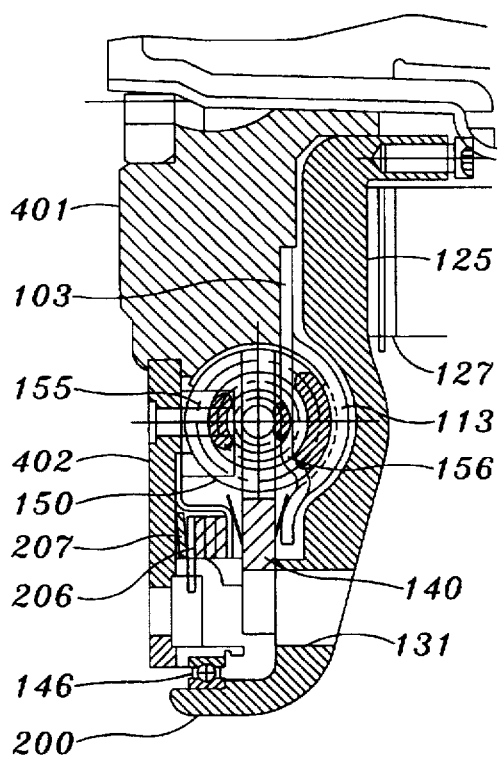
FIG. 4: a view similar to FIG. 1, for another embodiment.
Figure 5:
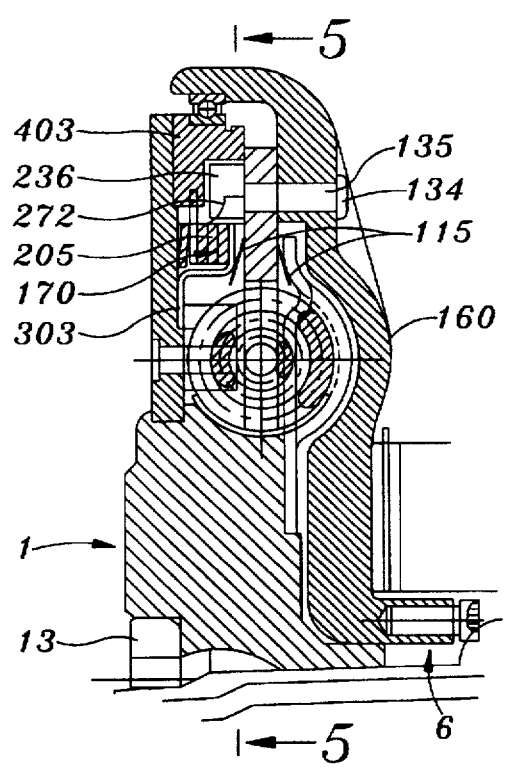
FIG. 5: a view in cross section taken on the line 5—5 in FIG. 4.
Figure 5:
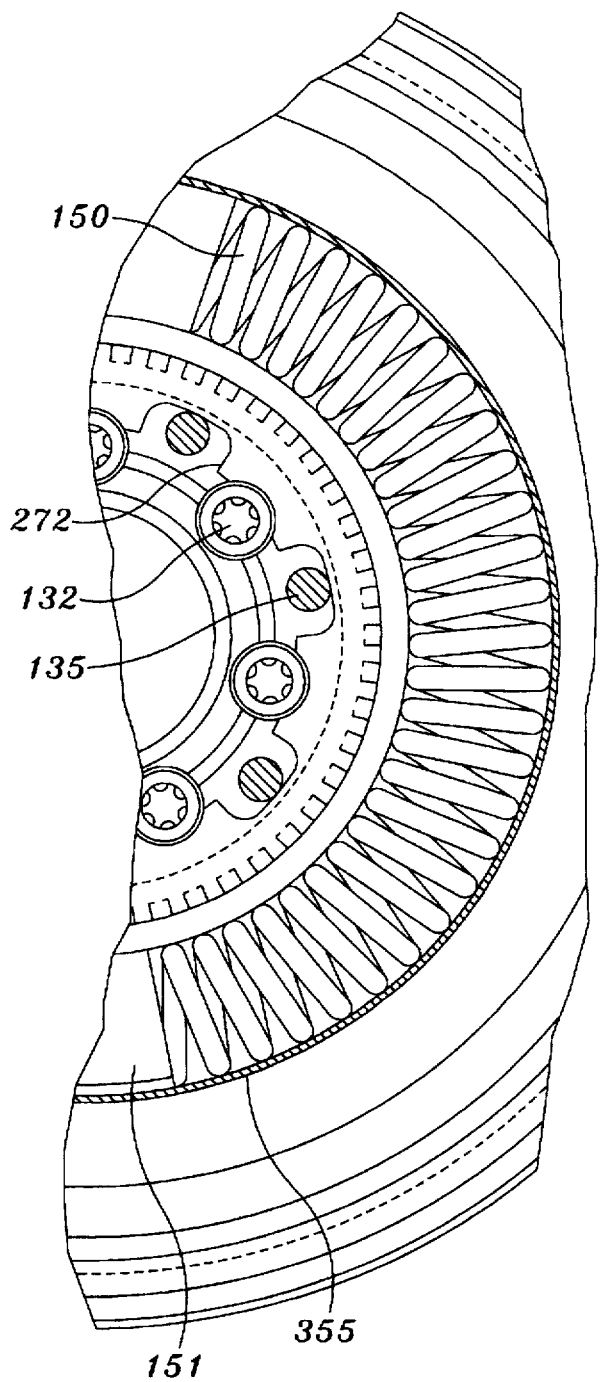

In FIGS. 4 and 5, the second mass is configured at its inner periphery in such a way as to have a tubular flange 200 which replaces the flange 100 of FIG. 1.

To this end, the mass 6 has a reduced thickness at its inner periphery, and that one of its surfaces which faces away from the first mass is inclined in the direction going from the arched portion 160 to the tubular flange 200, with a rounded portion being defined for joining the tubular flange 200 to the generally transversely orientated main portion of the mass 6.

It will be noted that in practice, the mass 6 is ribbed between the arched portion 160 and the tubular flange 200.

As will have been understood, the profile of this mass is so configured as to match the profile of the hub 101 of FIG. 1.

In this Figure, the damper plate 140 is simplified, and is generally flat, being secured by means of the rivets 134, 135, 236.

It will be noted that the sealing rings 115, fitted on either side of the damper plate 140, are provided at their outer periphery with holes for passage of the shank 135 of the fastening rivets 134, 135, 236.

These rings 115 are thus fixed to the second mass 6 for rotation with it. In this example, one of the rings is gripped between the mass 6 and the damper plate 140, while the other one is gripped between the damper plate 140 and the head 236 of the fastening rivets 134, 135, 236.

In these Figures, the axially acting friction means 170 is disposed radially inwardly of the resilient means 150, which enables the inertia of the outer peripheral part 401 of the mass 1 to be increased even more.

The friction device comprises, in succession in the axial direction going from the plate 402 to the second mass 6, an axially acting resilient ring 207 which in this example is a diaphragm, but which in a modified version may be a corrugated ring, a thrust ring 206, a friction ring 205 and a transverse surface which is part of a member 303 fixed on the plate 402.

This member 303 surrounds the rings 207, 206, 205, and has at its outer periphery a transverse flange for fastening it to the plate 402. It also has a plate portion for contact with the friction ring 205. This plate portion accordingly has a surface for frictional engagement with the ring 205, and extends radially towards the axis of the assembly, while the other plate portion (i.e. the fastening plate portion) extends radially away from the axis of the assembly.

The thrust ring 206 has at its inner periphery lugs with openings which define mortices, for engagement, in this example without any clearance, with complementary tenons of the member 403 for supporting the rolling bearing 28 at its outer periphery.

The ring 205, which is preferably of a synthetic material, has at its inner periphery openings which constitute mortices for meshing with a clearance with the head 236 of the rivets 134, 135, 136, which are configured accordingly.

It will be noted that the member 303 offers an abutment to the outer periphery of one of the sealing rings 115. These sealing rings are inclined, as can be seen in the lower part of FIG. 4, radially from the shank 135 of the rivets 134, 135, 236 towards the resilient means 150. The rings 115 are fitted under precompression.

The other sealing ring 115 engages at its outer periphery on the closure member 103, which is again simplified. Thus, during the relative movement between the two masses, and after the clearance has been taken up between the slots 272 and the shanks 135, the friction ring 205 is caused to engage frictionally against the member 303 and against the thrust ring 206 which is mounted in rotation on the part 403.

All of these arrangements lead to an increase in the inertia of the first mass, and the damper plate or disc 140 is simplified, as is the closure member 103.

We claim:

1. A damped flywheel comprising two coaxial masses (1, 6), mounted for movement of one with respect to the other against circumferentially acting resilient means (150) and against an axially acting friction means (170), with one of the masses, referred to as the first mass (1), being adapted to be mounted in rotation on a driving shaft (30), while the other mass (6), referred to as the second mass, comprises a reaction plate (161) offering a friction face (125) for a friction disc (127) which is adapted to be mounted in rotation on a driven shaft, wherein the resilient means (150) are disposed entirely radially inwardly of the inner periphery of the friction face (125) of the second mass (6) and the second mass (6) has an arched portion (160) for overlapping the resilient means installed on the first mass (1).

2. A flywheel according to claim 1, wherein the friction means (170) is disposed radially outwardly of the resilient means (150).

3. A flywheel according to claim 1, wherein the friction means (170) is disposed radially inwardly of the resilient means (150).

4. A flywheel according to claim 1, wherein the second mass (6) comprises means (135) for fastening to a damper plate (140) which is adapted to act on the resilient means (150), with the damper plate having an axial flange (100) which penetrates into a hole in the first mass (1), and which is coupled to it in rotation by means of an anti-friction bearing (146).

5. A flywheel according to claim 4, wherein the damper plate has U-shaped recesses (144) bounded by radial arms (151), between which the resilient means (150) are fitted, a closure element (103) being interposed between the resilient means (150) and the second mass (6), in such a way as to define a cavity which is sealed by an annular double seal (115) which is disposed between the first mass and the damper plate (140) on the one hand, and between the damper plate (140) and the said second mass (6) on the other hand.

6. A flywheel according to claim 5, wherein the double seal (115) comprises a first part, the outer diameter of which is engaged on a dihedral projection of the said first mass (1), with its inner diameter being engaged in contact with an inclined portion (142) of the said damper plate (140), and in that it comprises a second part, the inner diameter of which is engaged on the said inclined portion (142) of the said damper plate (140), with its outer diameter being engaged in contact with the inner face of the end portion (114) of the closure element (103) beyond an arched portion (113) of the latter, the said arched portion being adapted to fit within the arched portion (160) of the said second mass (6).

7. A flywheel according to claim 2, wherein the friction means (170) has a friction surface (203) disposed within a cavity (110) in the first mass (1), on the surface of the latter that faces towards the second mass (6), on which friction surface there is disposed a friction ring (105), the movements of which are governed by the said second mass (6) and on which there bears a thrust ring (106) which is urged elastically towards it by axially acting resilient means (107).

8. A flywheel according to claim 7, wherein the friction surface (203) comprises a flat end zone of the closure element (103) which further includes a flange (109) for maintaining in action, through an annular ring (108), the axially acting resilient means.

9. A damped flywheel comprising two coaxial masses (1, 6), mounted for movement of one with respect to the other against circumferentially acting resilient means (150) and against an axially acting friction means (170), with one of the masses, referred to as the first mass (1), being adapted to be mounted in rotation on a driving shaft (30), while the other mass (6), referred to as the second mass, comprises a reaction plate (161) offering a friction face (125) for a friction disc (127) which is adapted to be mounted in rotation on a driven shaft, wherein the resilient means (150) are disposed entirely radially inwardly of the inner periphery of the friction face (125) of the second mass (6), wherein the friction means (170) is disposed radially outwardly of the resilient means (150), the friction device (570) has a friction surface (203) disposed within a cavity (110) in the said first mass (1), on the surface of the latter that faces towards the said second mass (6), on which friction surface there is disposed a friction ring (105), the movements of which are governed by the said second mass (6) and on which there bears a thrust ring (106) which is urged elastically towards it by axially acting resilient means (107) and frictional engagement is obtained by engagement of at least one projecting element (171) formed by moulding on a facing surface of the second mass (6).

10. A damped flywheel comprising two coaxial masses (1, 6), mounted for movement of one with respect to the other against circumferentially acting resilient means (150) and against an axially acting friction means (170), with one of the masses, referred to as the first mass (1), being adapted to be mounted in rotation on a driving shaft (30), while the other mass (6), referred to as the second mass, comprises a reaction plate (161) offering a friction face (125) for a friction disc (127) which is adapted to be mounted in rotation on a driven shaft, wherein the resilient means (150) are disposed entirely radially inwardly of the inner periphery of the friction face (125) of the second mass (6) wherein the engagement is obtained by means of an internal flange (172) corresponding to the inner diameter of the friction ring to obtain meshing with a clearance.

* * * * *